March 29, 1932.  B. F. FITCH ET AL  1,851,539
SYSTEM OF HANDLING FREIGHT
Filed Sept. 27, 1929   4 Sheets-Sheet 1
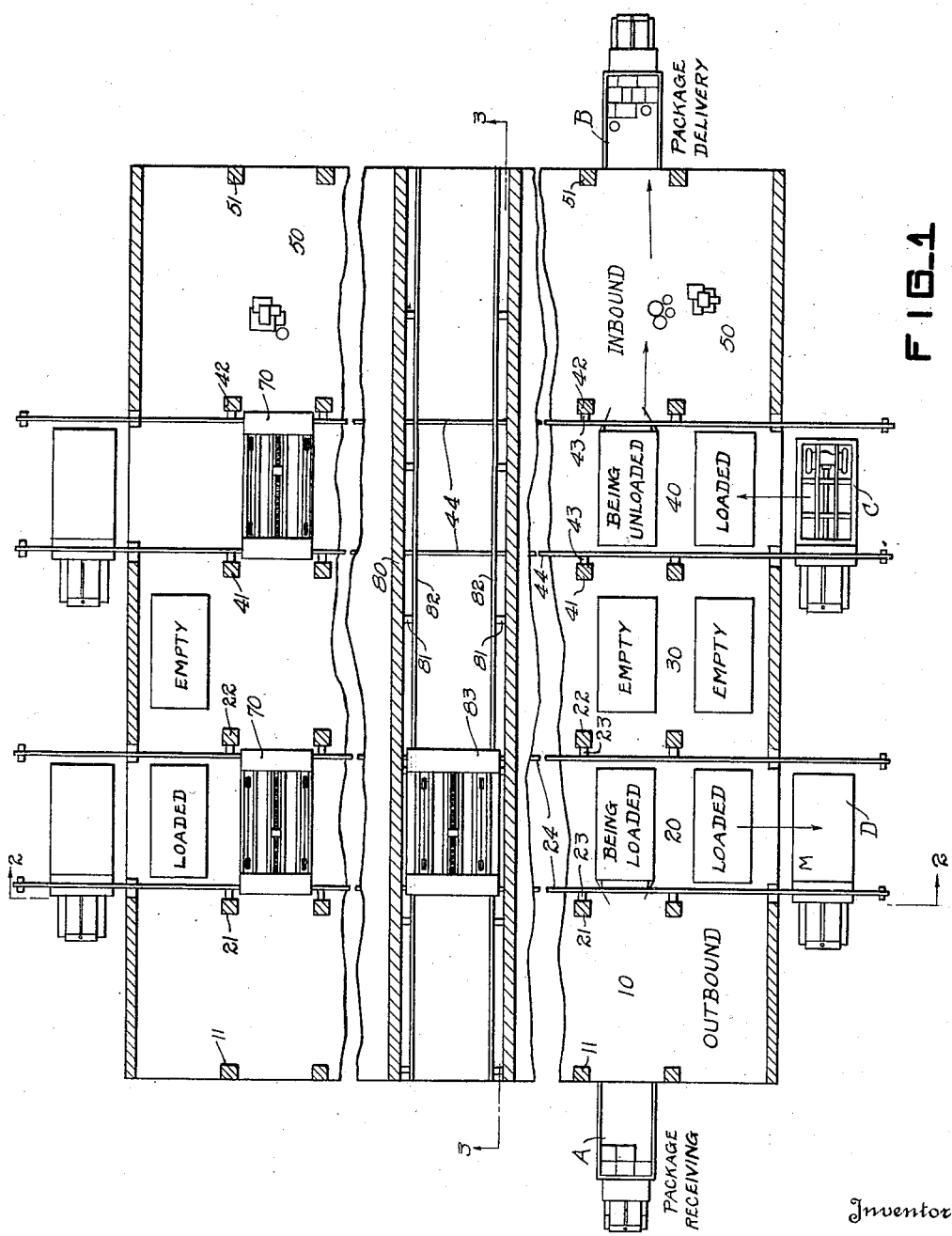

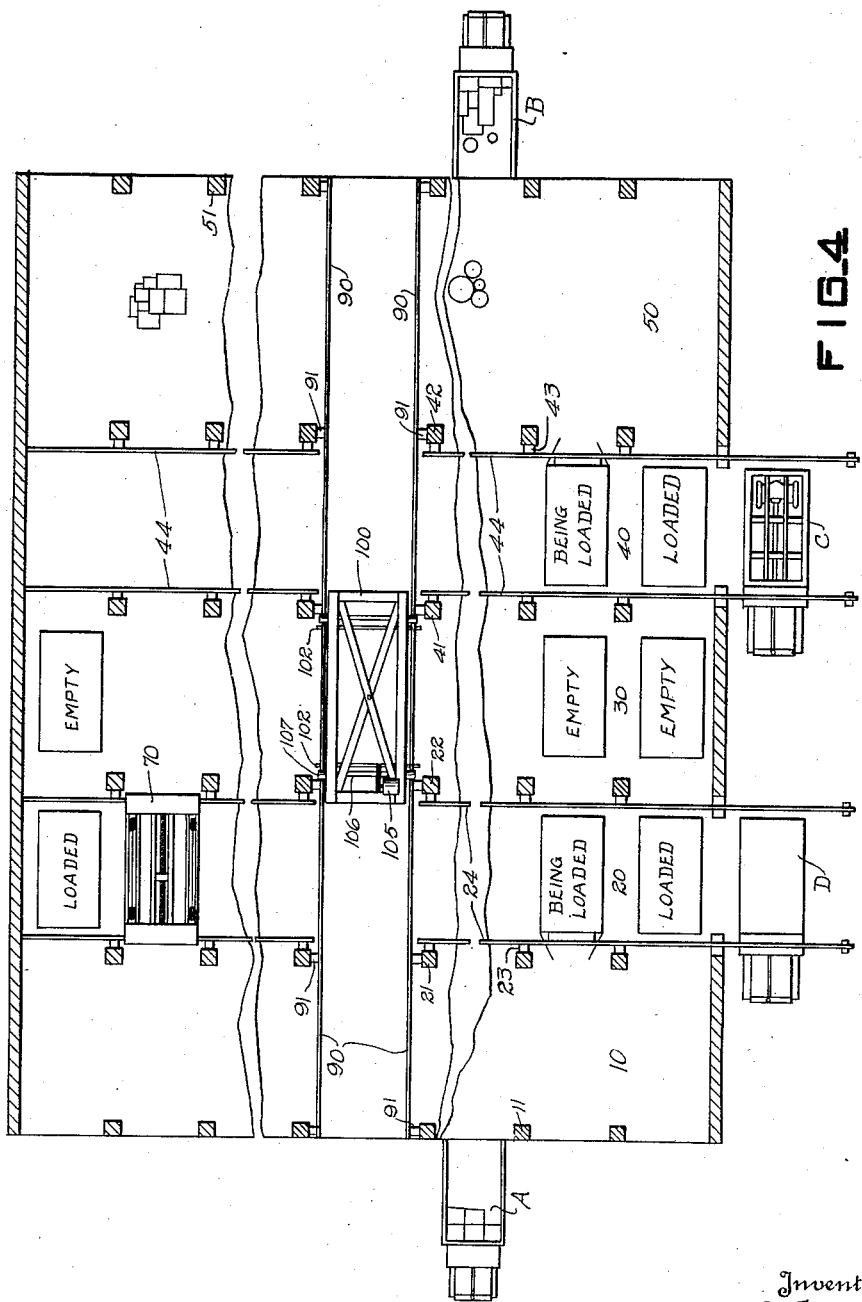

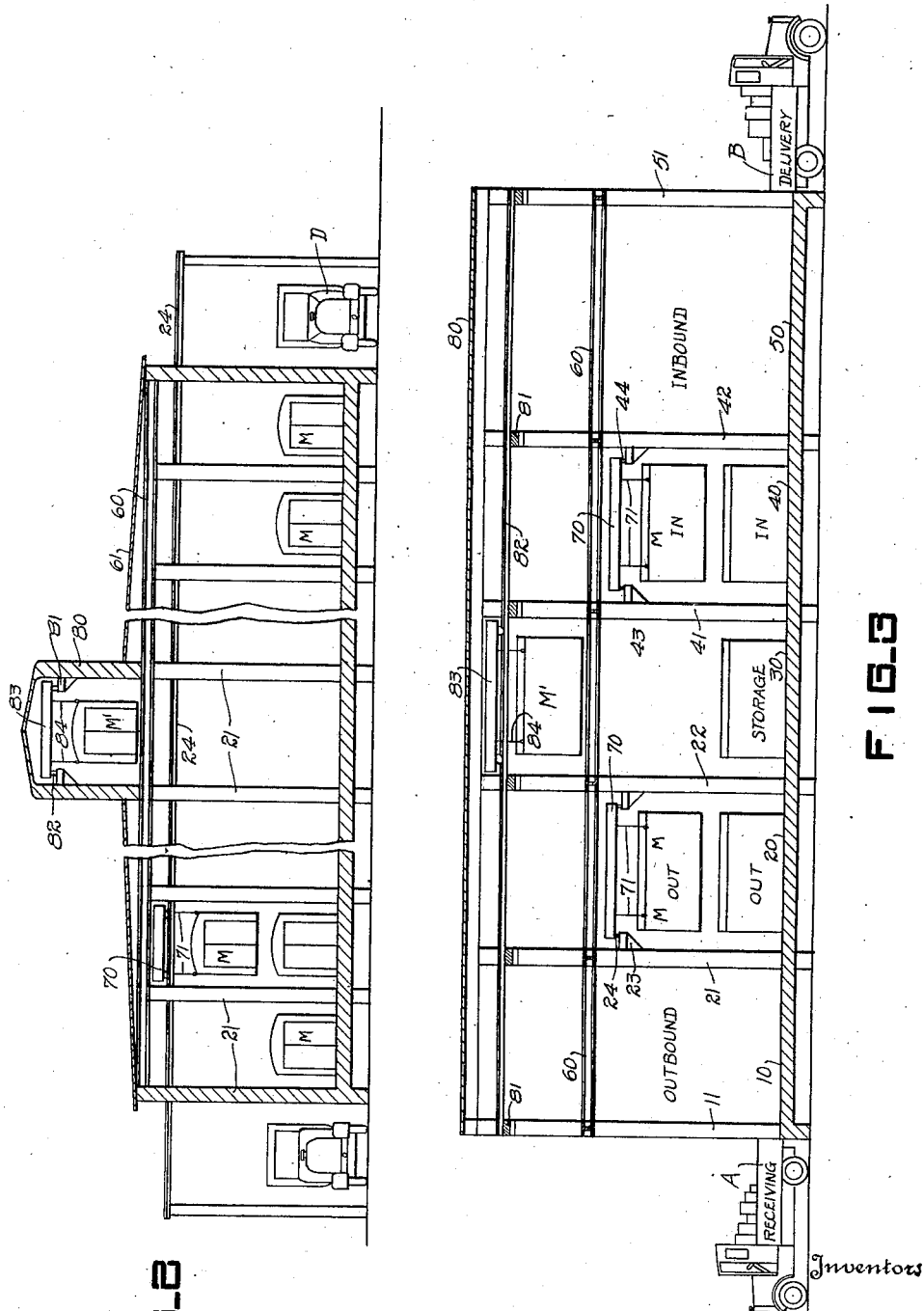

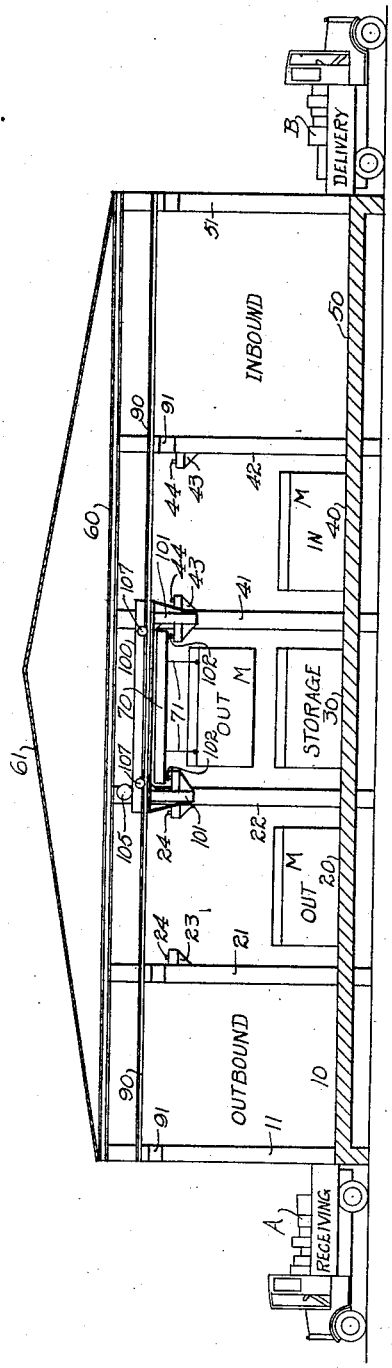

Patented Mar. 29, 1932

1,851,539

UNITED STATES PATENT OFFICE

BENJAMIN F. FITCH, OF GREENWICH, CONNECTICUT, AND ALBERT R. TEARE, OF LAKEWOOD, OHIO, ASSIGNORS TO MOTOR TERMINALS COMPANY, OF WILMINGTON, DELAWARE, A CORPORATION OF DELAWARE

SYSTEM OF HANDLING FREIGHT

Application filed September 27, 1929. Serial No. 395,672.

This invention relates to a transfer station equipped and arranged for handling demountable automobile bodies for readily receiving such bodies loaded, unloading package freight from such bodies and reloading package freight into unloaded bodies, and for the dispatch of the reloaded bodies. The station also provides for the convenient loading of the inbound packages into delivery carriers, and for the convenient receipt of freight from outbound carriers and its loading into the empty containers.

To the above end, we provide an inbound aisleway with a traveling crane adapted to remove loaded bodies from trucks at the end of the aisleway, we provide a parallel outbound aisleway equipped with a traveling crane to enable the freshly loaded body to be mounted on the truck and we provide a transversely acting overhead support to enable the lateral transfer of bodies from the inbound to the outbound aisleway or vice versa. Thus, for instance, bodies which have been deposited in the inbound aisleway and have just been emptied may be transferred into position in the outbound aisleway ready for reloading by package freight received on the outbound platform, and subsequently transferred to an automobile truck.

The two traveling cranes mentioned are each arranged to lift bodies for a greater distance above the platform than the height of a body, so that one body may be trolleyed over a body standing on the platform. This enables received bodies to be deposited in any vacant space in the inbound aisle, and, when empty, to be transferred to any vacant space in the outbound aisle for reloading, or bodies may be transferred from either aisle to a storage space, which is preferably intermediate of the two aisles.

A feature of our invention comprises so arranging the laterally movable transfer device that it shall not prevent through longitudinal movement of cranes over the respective aisle spaces, but may effect the lateral transfer of suspended bodies, preferably at an elevation which will enable them to pass over intermediate bodies. One way in which we may accomplish this is by having a transfer crane located in a pent house above the path of travel of the aisle cranes and arranging the tracks of the aisle cranes so that there is space enough between them for the passage of a body to a position entirely above such tracks. Our second way in which we propose to accomplish this result is to provide a lateral crane trackway above the plane of the aisle trackways and then interrupt these aisle trackways where the lateral trackway passes over them and provide on the lateral trackway, a shiftable member, which has crane tracks adapted to align with the interrupted aisle tracks. Accordingly, when such alignment is effected the crane of that aisle may be run onto the tracks of the transfer device and carried bodily with its load to the other aisle, when it may be run off of the transfer device onto the trackways of that aisle.

The aisles and traveling cranes are so arranged that the bodies are preferably trolleyed sidewise, and these bodies are provided with doors at opposite ends, so that in loading the package freight on the outbound platform, such freight may be transferred directly into the open end of the body from one or more vehicles at the opposite edge of the platform, or from piles of packages temporarily deposited on the platform. Similarly at the inbound aisleway, the freight is hand trucked through the open doors at the other ends of the bodies onto the inbound platform and there piled or carried to the delivery package carrier. As such carriers may not be available at the time the body is received, the inbound platform is preferably made wider than the outbound, to provide more storage space.

The drawings illustrate our invention with the two different embodiments of transfer mechanism above mentioned. Fig. 1 is a sectional plan of a transfer station having through tracks for both the longitudinal and transfer cranes, this view being broken away in two regions to show the two end portions and the central portion of the station; Fig. 2 is a sectional side elevation similarly broken away of the embodiment shown in Fig. 1; Fig. 3 is a sectional end view of this embodiment; Fig. 4 is a plan similar to Fig. 1 but illustrating the embodiment having interrupted aisle crane ways, and Fig. 5 is a sectional end elevation of this embodiment.

As shown in Figs. 1, 3, 4 and 5, 10 indicates and outbound platform, 20 an adjacent outbound aisleway, 30 a storage space, 40 an inbound aisleway and 50 an inbound platform. The outer edges of the outbound and inbound platforms are preferably at the height of the floor level of the package-receiving trucks A, which may back up against the outbound platform, and the package-delivering trucks B, which may back up against the inbound platform. The three intermediate aisles 20, 30 and 40 comprise a substantially continuous single plane registering with the inbound platform, and the outbound platform.

Along the edges of the various platforms or aisle spaces are rows of columns as indicated at 11, 21, 22, 41, 42 and 51. These columns carry the ceiling braces 60 and the roof 61. The columns 21 and 22 also carry the outbound traveling cranes and the columns 41 and 42 the inbound traveling cranes. Trackways 24 and 44 respectively for these cranes are supported on brackets 23 and 43 carried by the proper columns on their inner sides and at a height above the corresponding platform somewhat greater than twice the height of a demountable body. Traveling on these trackways are cranes 70, each of which preferably has four depending cables 71 located at the four corners of a rectangle and adapted to engage suitable hooks or eyes on the demountable truck bodies, indicated by M.

The crane trackways 24 and 44 overhang one or both ends of the station (Fig. 1 shows them overhanging both ends) and beneath such overhanging portion is a runway for trucks adapted to deliver loaded bodies to the receiving aisle 40 and receive loaded bodies from the discharging aisle 20. A truck is shown at C at the inbound aisleway, its body having been removed, and a truck D is shown at the outbound aisleway, the loaded body M having just been deposited thereon.

We will now describe the respective embodiments of the lateral transfer mechanism. Referring first to the form shown in Figs. 1, 2 and 3, as appears in these figures, 80 indicates a pent house located at an intermediate region of the building and extending transversely at least across the inbound and outbound aisles and the intermediate storage aisle, although we have shown the pent house extending also across the inbound and outbound platforms. The walls of this pent house have inward brackets 81 carrying trackways 82 on which is a laterally moving crane 83. This crane is of similar construction to the longitudinally moving cranes already described and has four simultaneously operating depending cables 84 adapted to be attached to any of the removable bodies, whereby it may be transferred laterally.

With the arrangement described, the space in the inbound and outbound aisle beneath the pent house is normally left unoccupied. Now, when any received body in the inbound aisle has been emptied, this body is lifted and trolleyed by its crane 70 and deposited in the space beneath the penthouse. It is then lifted by the transfer crane 83 passing upwardly between the two trackways 44, where it is suspended entirely above these trackways as indicated at M' in Fig. 2. The crane 83 is then trolleyed laterally, as indicated in Fig. 3, to a position over the outbound aisleway for instance, then deposited in the open space in that aisleway, after which it may be lifted by the crane 70 of that aisleway and transferred to any available space on such aisleway. If desired, the traveling crane 83 may operate to transfer a body deposited beneath the transfer craneway in either the inbound or outbound aisleway to the storage aisleway, or, as an emergency, a body may be transferred from any of the aisleways and deposited temporarily on the inbound or outbound platform.

It will be seen that this system enables the demountable body to be received loaded from an arriving truck, immediately deposited on a vacant space on the platform and its contents removed and hand-trucked to the delivery vehicle, and thereupon the body transferred to the outbound aislespace, where it may be reloaded and then delivered to an outgoing truck.

In place of the transfer crane 83 in the pent house entirely above the through aisle trackways, we may employ the interrupted trackway construction of Figures 4 and 5, which will now be described.

In Figs. 4 and 5, we have indicated at 90 a transfer bridge trackway, which is located above the plane of the aisle trackways 24 and 44. This lateral trackway may extend continuously from one outside wall of the building to the other as shown in Figs. 4 and 5, or it may extend only over the intermediate space covering the inbound and outbound and storage aisleways. As shown, the tracks 90 are mounted on brackets 91, which are carried by some of the columns 21, 22, 41, 42 which carry the aisle trackways 24 and 44.

The transverse trackway 90 is located at such distance above the aisle trackways as to clear the traveling crane 70 which may run on the aisle trackways. These aisle trackways however, are interrupted in the region beneath the transferway. Riding on the trackway 90 is a wheeled-bridge 100 which has depending portions 101, which by suitable inward brackets carry a pair of rails 102 with the same spacing and on the same elevation as the aisle trackways 24 and 44. Accordingly, this bridge may be located so that its two rails 102 align with the rails 44 of the inbound aisleway, or so that these rails 102 align with the rails 24 of the outbound aisleway. This enables the traveling crane 70 to be passed from either of these aisleway tracks onto the track 102 of the transfer bridge and shifted thereby laterally with its load.

The embodiment shown in Figs. 5 and 6 and just described enables the bodies to be received, unloaded, transferred, reloaded and discharged in a system of operation similar to that described for the other embodiment. Thus, a loaded body arriving by the truck C may be lifted by a crane 70 on the trackway 44, deposited in a suitable location, unloaded through one of its end doorways and its contents hand trucked to the delivery vehicle B. The crane 70 then picks up such unloaded body and trolleys it lengthwise of the station until the crane 70 passes onto the bridge which at that time is located with its rails 102 aligning with the rails 44. Then the bridge may carry this crane with its body to the outbound aisle, whereupon the crane 70 acting in this aisle carries the body to any convenient location where it may be reloaded and afterwards deposited on the outbound truck B. In these movements the body being transferred may pass over other bodies as indicated in Fig. 5.

The bridge 100 is preferably provided with a suitable electric motor gearing with the shaft of one pair of its supporting wheels, whereby it may be propelled along its trackway 90, as desired. I have indicated such motor at 105 geared with the shaft 106 of the wheels 107.

It will be seen that our apparatus provides for a very flexible operation according to traffic conditions existing at the time. A loaded body received from truck C may be trolleyed lengthwise of the house over other bodies that may be standing in the aisle 40 and deposited in any available space for unloading. Or, if there is no such space at the time, the body may be carried by its crane 70 to the transfer region and then transferred by the bridge 100 or the crane 83 to a storage space on either platform, and later returned by reverse operation to a position for unloading. When unloaded in the aisle 40, the empty body may if desired be rolled by suitable hand trucks (or on wheels of its own, if such are employed) to the storage space, to be later progressed by similar means to the outbound aisle. Once in the outbound aisle, the body may be there reloaded and then lifted by the crane 71 for depositing on the outgoing truck D.

We claim:—

1. In a transfer station, the combination of a pair of vehicle aisleways one for incoming bodies, the other for outgoing bodies, an inbound platform on the outer side of the incoming aisleway, an outbound platform on the outer side of the outgoing aisleway, vehicle runways on the outer sides of the two platforms, a pair of crane trackways above the respective aisleways and parallel therewith, a vehicle runway extending transversely beneath both crane trackways, an overhead transverse trackway extending across both aisle trackways, hoisting and raising means adapted to travel on an aisle trackway, and a trolleying support adapted to travel on the overhead transverse trackway, whereby a demountable body may be raised from a vehicle in the transverse runway, trolleyed lengthwise of the inbound aisleway, deposited and unloaded, thereafter trolleyed transversely to the outbound aisleway, reloaded and deposited on a vehicle in the transverse runway.

2. In a transfer station, the combination of inbound and outbound aisleways with platforms on their outer sides, vehicle runways on the outer sides of said platforms, longitudinal crane trackways supported overhead above such aisleways respectively, a transverse vehicle runway overhung by such crane trackways, a transverse trackway at a higher level than the longitudinal trackways and extending uninterruptedly from one aisle region to the other, a transversely movable supporting device on the transverse trackway adapted to support a suspended body, and a traveling crane on one of the aisle trackways adapted to support a suspended body and pass beneath the transverse trackways.

3. A freight transfer station having a platform providing a pair of parallel longitudinal aisleways with inbound and outbound package space on their outer sides respectively, crane trackways above the respective aisleways overhanging a vehicle runway at the end of the platform, a traveling crane on each trackway, a transverse pent house above the two crane trackways, and a traveling crane in said pent house adapted to raise a body between the rails of either longitudinal trackway to a position entirely above the plane of such trackway and there transport it to a position above the other longitudinal trackway and lower it between the rails of that trackway.

4. An apparatus for transferring freight comprising a transfer station having a pair of overhead crane trackways with platforms below them, automobile trucks having demountable bodies, cranes on the trackways adapted to lift bodies from the trucks and deposit them in an aisle or vice versa, the rails of the crane trackways being farther apart than the maximum length of the bodies, a crane trackway at a higher elevation than the trackways mentioned and extending crosswise of them, and a traveling crane on the last mentioned crane trackway adapted to raise a body between the rails of either aisle trackway entirely above the plane of that trackway and transport it to a position over the other aisle trackway and then lower it between the rails of that trackway.

5. In a transfer station, the combination of a platform providing a pair of parallel aisleways one for incoming bodies and the other for outgoing bodies, crane trackways above the respective aisleways each comprising a pair of rails spaced apart, a transverse trackway comprising a pair of rails spaced apart, a traveling crane on one of the aisleway trackways adapted to raise and transport a body lengthwise of the aisleway, and a trolleying device on the transverse trackway adapted to carry a raised body from one aisleway to the other, the longitudinal and transverse trackways being at right angles to each other and one of them having its rails spaced a slightly greater distance than the length of a body and the other having its rails spaced a slightly greater distance than the width of a body.

6. The combination of trucks having demountable bodies materially longer than they are wide, a freight transfer station having a pair of parallel longitudinal aisleways for inbound and outbound bodies respectively, crane trackways above the respective aisleways each comprising a pair of rails spaced apart a greater distance than the length of said demountable bodies, a traveling crane on each trackway, a transverse crane trackway above the trackways first mentioned, and a crane on the transverse trackway adapted to raise one of said demountable bodies between the rails of either longitudinal trackway and entirely above the plane of each trackway.

7. An apparatus for transferring freight comprising a station provided with two longitudinal crane trackways, one for incoming bodies and the other for outgoing bodies, a transverse vehicle runway extending beneath both of said crane trackways, a lateral trackway, means adapted to be on the longitudinal trackways for raising bodies and trolleying them along such trackways, means on the lateral trackway for transferring a raised body from one longitudinal trackway to the other, platforms on the outer sides of the lanes beneath the two crane trackways, and vehicle runways on the outer sides of the two platforms.

In testimony whereof, we hereunto affix our signatures.

BENJAMIN F. FITCH.
ALBERT R. TEARE.